Figure 1:
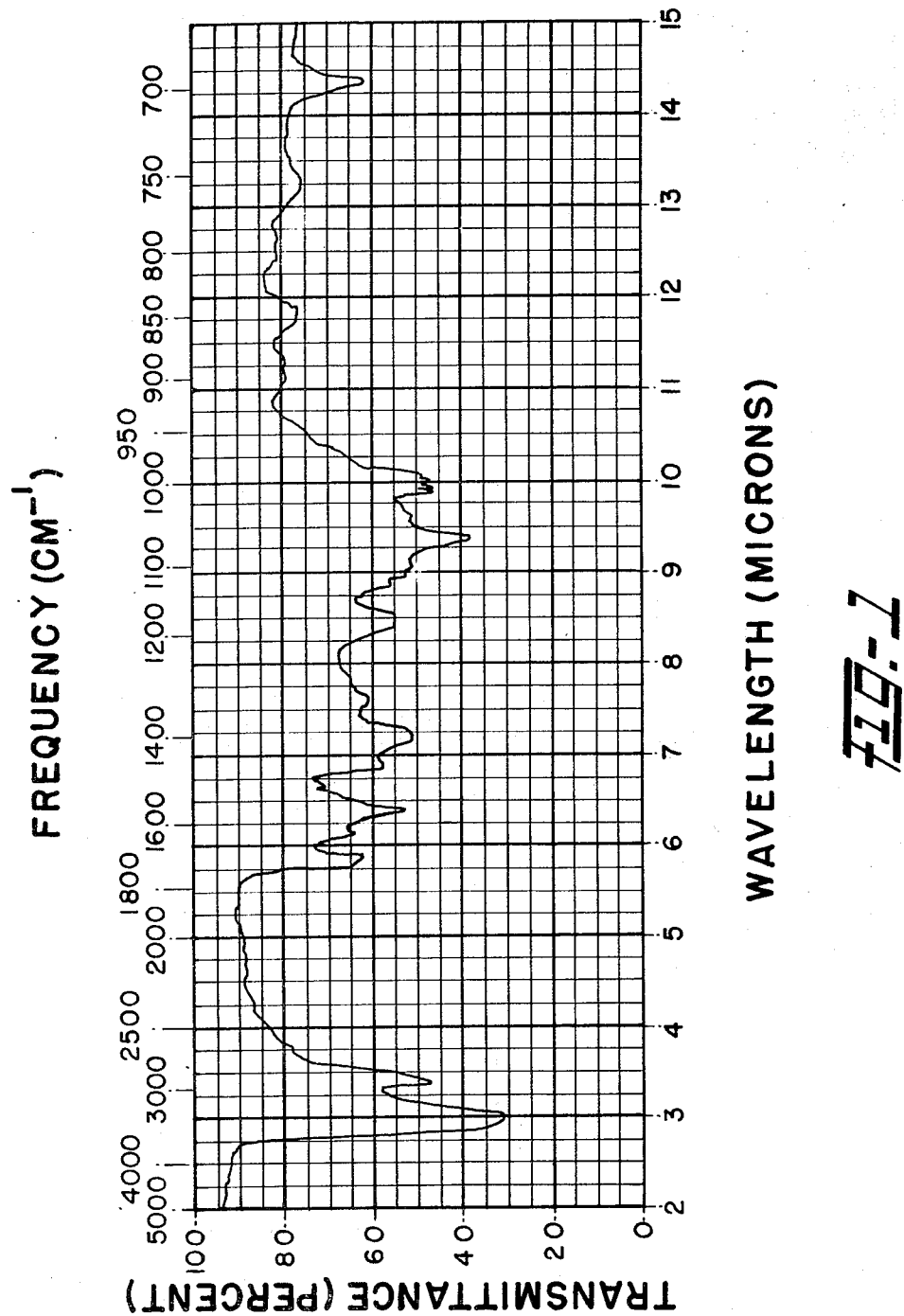

United States Patent
Martin et al.

[15] 3,700,769

[45] Oct. 24, 1972

[54] ANTIFUNGAL BH890

[72] Inventors: John Henry Edward James Martin, New City, N.Y.; John Norman Porter, Ramsey, N.J.

[73] Assignee: American Cyanamid Company, Stamford, Conn.

[22] Filed: April 14, 1969

[21] Appl. No.: 815,610

[52] U.S. Cl..................................424/119, 424/120
[51] Int. Cl. ..............................................A61k 21/00
[58] Field of Search..............................424/119, 120

[56] References Cited

UNITED STATES PATENTS 3,159,541  12/1964  Cataldi et al. ..............424/120
3,377,242  4/1968  Lefemine et al...........424/120

Primary Examiner—Albert T. Meyers
Assistant Examiner—Daren M. Stephens
Attorney—Norton S. Johnson

[57] ABSTRACT

A new antifungal compound, designated BH890, is produced by cultivating a new strain of *streptomyces misionensis* NRRL 3609. The new antifungal can be used to inhibit growth of a variety of fungi, as, for example, *Candida albicans* and *Cryptococcus neoformans*.

3 Claims, 2 Drawing Figures

ANTIFUNGAL BH890

This invention relates to a new antifungal, to its production by fermentation, to methods for its recovery and concentration from crude solutions, and to processes for its purification. The novel products are active against a variety of fungi, and the effects of the new antifungal on specific microorganisms, together with its chemical and physical properties, differentiate it from previously described antifungals.

The new antifungal, which we have designated BH890, is formed during the cultivation under controlled conditions of a streptomycete isolated from a forest soil sample collected in Pennsylvania. A viable culture of the new microorganism has been deposited with the Culture Collection Laboratory, Northern Utilization Research and Development Division, United States Department of Agriculture, Peoria, Ill., and has been added to its permanent collection. It is freely available in this repository under its Accession No. NRRL 3609.

The description and identification of this new microorganism, maintained in the culture collection of Lederle Laboratories, Pearl River, N.Y., was supplied by Dr. H. D. Tresner of these laboratories.

Observations were made of the cultural, physiological and morphological features of the culture in accordance with the methods detailed by Shirling et al., ["Methods for Characterization of Streptomyces Species." Internat. Journ. of Syst. Bacteriol. 16:313–340, (1966)] those recommended by Pridham et al., ["A selection of Media for Maintenance and Taxonomic Study of Streptomyces," Antibiotics Annual (1956–1957), pp. 947–953], for the cultivation of streptomycetes. Details are recorded in Tables I-IV, and a general description of the culture is given below. Underscored descriptive colors were taken from Jacobson et al., ["-Color Harmony Manual." 3rd edit. Container Corp. of America, Chicago (1948)].

AMOUNT OF GROWTH

Good on most media; light on Czapek's solution agar.

AERIAL MYCELIUM AND/OR EN MASSE SPORE COLOR

Aerial mycelium whitish to grayish or tan; spore masses in grayish shades, ranging from Covert Tan (2 ge) to Natural (2 dc) to Slate Tan (2 ig) to Covert Gray (2 fe) to Beige Brown (3 ig). Sporulation light to heavy depending upon medium.

SOLUBLE PIGMENTS

Soluble pigments not formed on the media used.

REVERSE COLOR

In yellowish to grayish to dark greenish shades.

MISCELLANEOUS PHYSIOLOGICAL REACTIONS

Nitrates reduced to nitrites in organic nitrate broth; complete liquefaction of gelatin in 14 days; melanoid pigments not produced on peptone-iron agar; tolerates up to 7 percent NaCl in growth medium. Carbon source utilization, according to the Pridham et al., ["The Utilization of Carbon Compounds by Some Actinomycetales as an Aid for Species Determination." J. Bacteriol. 56:107–114 (1948)] method, as follows: fair to good utilization of l-arabinose, d-fructose, i-inositol, lactose, d-mannitol, d-melibiose, d-raffinose, l-rhamnose, salicin, d-trehalose, d-xylose and glucose; no utilization of adonitol, d-melezitose and sucrose.

MICROMORPHOLOGY

Aerial mycelium heavy, giving rise to short, compact spiral chains of globose to short cylindrical spores 0.5–0.6μ × 0.9–1.1μ; spore surfaces smooth, as determined by electron microscopy at 8,000X.

On the basis of the general characteristics observed, the culture is a member of the genus Streptomyces. The grayish sporulation, spiralled chains of smooth spores and lack of melanoid pigment allies the culture with a relatively large group of Streptomyces species. However, certain characteristics such as its compact spirals of globose to occasionally short, cylindrical spores suggests a close relationship to species of the *Streptomyces hygroscopic*-like complex. When comparisons were made with members of this group, it became evident that the new culture differed, in that it lacked the conspicuous hygroscopic nature of spore masses normally associated with *S. hygroscopicus*. Additionally, spores of the latter are typically short-cylindrical and phalangiform in appearance, Tresner et al., ["Morphological Spore Types in the *Streptomyces hygroscopicus*-like Complex." Appl. Microbiol. 15:637–639, (1967)], whereas those of NRRL 3609 were most often globose. A very striking resemblance was found, however, to the

TABLE I

Cultural Characteristics of *Streptomyces misionensis* NRRL 3609

Incubation 14 days; Temperature: 28° C.

| Medium | Amount of growth | Aerial mycelium and/or spores | Soluble pigment | Reverse color | Remarks |
|---|---|---|---|---|---|
| Czapek's solution agar. | Light | Aerial mycelium whitish. Sporulation light. | None | Colorless | |
| Asparagine dextrose agar. | Good | Aerial mycelium whitish, becoming Covert Tan (2 ge) in sporulation zones. Sporulation moderate. | ---do--- | Slate Tan (2 ig) to unnamed (18 pn) [dk. green]. | Reverse mottled. |
| Hickey and Tresner's agar. | ---do--- | Aerial mycelium whitish to gray, becoming Natural (2 dc) in sporulation zones. Sporulation light. | ---do--- | Bamboo (2 gc) to unnamed (18 pn). | Reverse mottled; moderate sectoring. |
| Yeast extract agar | ---do--- | Aerial mycelium gray to tan, becoming Slate Tan (2 ig) in sporulation zones. Sporulation heavy. | ---do--- | Adobe Brown (3 ig) to Clove Brown (3 ni) to unnamed (18 pn). | Do. |
| Kuster's oatflake | ---do--- | Aerial mycelium gray to tan, becoming Slate Tan (2 ig) in sporulation zones. Sporulation moderate. | ---do--- | Lt. Mustard Tan (2 ie) to unnamed (18 pn). | Do. |
| Tomato paste oatmeal agar. | ---do--- | Aerial mycelium gray to tan, becoming Slate Tan (2 ig) in sporulation zones. Sporulation light. | ---do--- | Yellow Maple (3 ng) to unnamed (18 pn). | Reverse mottled. |
| Potato dextrose agar. | ---do--- | Aerial mycelium white to grayish becoming Covert Gray (2 fe) in sporulation zones. Sporulation moderate. | ---do--- | Camel (3 ie) to unnamed (18 pn). | Reverse mottled; starch hydrolysis light. |
| Bennett's agar. | ---do--- | Aerial mycelium gray to tan, becoming Slate Tan (2 ig) in sporulation zones. Sporulation moderate. | ---do--- | Covert Brown (2 li) to unnamed (18 pn). | Reverse mottled; moderate sectoring. |
| Inorganic salts-starch agar. | ---do--- | Aerial mycelium whitish, becoming Beige Brown (3 ig) in sporulation zones. Sporulation heavy. | ---do--- | Biscuit (2 ec) to Slate Tan (2 ig) to unnamed (18 pn). | Do. | species *Streptomyces misionensis*, Cercos et al., ["Misionina: antibiótico poliénico producido por *Streptomyces misionensis*," n. sp. Revista de Investigaciones Agricolas 16:5–28 (1962)]. Good agreement was observed in spore color, sporophore morphology, spore shape, spore surface configuration, melanoid pigment production and carbon source utilization patterns. Furthermore, such cultural features as growth habit, color of vegetative mycelium and the mottled appearance of the culture reverses on certain media, were remarkably similar. When comparisons were made with the published descriptions and/or reference cultures of other species, none was found that more closely resembled this culture that *S. misionensis*. Therefore, NRRL 3609 will, hereafter, be considered a strain of that species.

TABLE II

Micromorphology of *Streptomyces misionensis* NRRL 3609

| Medium | Aerial Mycelium And/Or Sporiferous Structures | Spore Shape | Spore Size | Spore Surface |
| --- | --- | --- | --- | --- |
| Yeast Extract Agar | Aerial mycelium heavy giving rise to short, compact spiral chains of Spores. | Globose; occasionally short cylindrical | 0.5–0.6μ X 0.9–1.1μ | Smith as determined by electron microscopy at 8000X. |

TABLE III

Miscellaneous Physiological Reaction of

Streptomyces misionensis NRRL 3609
Temperature: 28°C.

| Medium | Incubation Period | Amount of Growth | Physiological Reaction |
| --- | --- | --- | --- |
| Organic Nitrate Broth | 7 days | Good | Slight reduction of nitrate to nitrate. |
| Organic Nitrate Broth | 14 days | Good | Nitrate reduced to nitrate. |
| Gelatin | 7 days | Good | Slight liquefaction |
| Gelatin | 14 days | Good | Complete liquefaction |
| Peptone-Iron Agar | 24 hrs. | Good | Melanoid pigments not formed |
| 4–13% NaCl in Yeast Extract Agar | 10 days | | Tolerated up to 7% NaCl in growth medium |

TABLE IV

Carbon Source Utilization Pattern of *Streptomyces misionensis* NRRL 3609

Incubation: 10 days
Temperature: 28°C.

| Carbon Source | Utilization* |
| --- | --- |
| Adonital | 0 |
| l-Arabinose | 3 |
| d-Fructose | 3 |
| i-Inositol | 2 |
| Lactose | 3 |
| d-Mannitol | 3 |
| d-Melezitose | 0 |
| d-Melibiose | 3 |
| d-Raffinose | 3 |
| l-Rhamnose | 3 |
| Salicin | 3 |
| Sucrose | 0 |
| d-Trehalose | 3 |
| d-Xylose | 2 |
| Dextrose | 3 |
| Negative Control | 0 |

* 3-Good Utilization 1-Poor Utilization 2-Fair Utilization 0-No Utilization

It is to be understood that for the production of the new antifungal the present invention is not limited to this particular organism or to organisms fully answering the above growth and microscopic characteristics which are given for illustrative purposes. In fact, it is desired and intended to include the use of mutants produced from the described organism by various means, such as x-radiation, ultraviolet radiation, nitrogen mustard, phage exposure, and the like.

THE FERMENTATION PROCESS

Cultivation of the organism *S. misionensis* may be carried out in a wide variety of liquid culture media. Media which are useful for the production of the novel antibiotic include an assimilable source of carbon such as starch, sugar, molasses, glycerol, etc.; an assimilable source of nitrogen such as protein, protein hydrolysate, polypeptides, amino acids, corn steep liquor, etc.; and inorganic anions and cations, such as potassium, sodium, calcium, sulfate, phosphate, chloride, etc. Trace elements such as boron, molybdenum, copper, etc.; are supplied as impurities of other constituents of the media. Aeration in tanks and bottles is provided by forcing sterile air through or onto the surface of the fermenting medium. Further agitation in tanks is provided by a mechanical impeller. An antifoaming agent, such as 1 percent octadecanol in lard oil may be added as needed.

INOCULUM PREPARATION

Shaker flask inoculum of *S. misionensis* is prepared by inoculating 100 milliliters of sterile liquid medium in 500 milliliter flasks with scrapings or washings of spores from an agar slant of the culture. The following medium is ordinarily used:

| | |
| --- | --- |
| Cerelose | 20 grams |
| Soy flour | 10 grams |
| Corn Steep liquor | 5 grams |
| Calcium carbonate | 3 grams |
| Water to | 1,000 milliliters. |

The flasks are incubated at a temperature from 25° to 29° C., preferably 28° C., and agitated vigorously on a rotary shaker for 30 to 48 hours. These 100 milliliter inocula are used to inoculate 1 liter and 12 liter batches of the same medium in 2-liter and 20-liter glass fermentors. The inoculum mash is aerated with sterile air while growth is continued for 30 to 48 hours. These batches of inocula are used to inoculate tank fermentors.

TANK FERMENTATION

For the production of BH890 in tank fermentors the following fermentation medium is regularly used:

| | |
| --- | --- |
| Starch | 52.5 grams |
| Corn flour | 14.5 grams |
| Corn steep liquor | 15.0 grams |

| | |
|---|---|
| Calcium carbonate | 9.5 grams |
| Ammonium sulfate | 6.75 grams |
| Casein | 3.0 grams |
| Cottonseed flour | 2.5 grams |
| Ammonium chloride | 2.0 grams |
| Manganese sulfate | 0.10 grams |
| Water to | 1,000 milliliters. |

Lard oil is added to the medium in the amount of 0.8 percent v/v. Each tank is inoculated with about 3 percent of the inoculum prepared as described above. Aeration is supplied at the rate of 0.5 to 1.0 liter of sterile air per liter of broth per minute and the fermenting mixture is agitated by an impeller driven at 300 to 800 r.p.m. The temperature is maintained at 25°–29° C., usually at 28° C. The fermentation is ordinarily continued for from 60 to 90 hours at which time the mash is harvested.

ISOLATION PROCEDURE

After the fermentation is completed, the fermented mash containing the antifungal of this invention is filtered, preferably with the addition of diatomaceous earth or any other conventional filter aid. Normally the mycelial filter cake pad is washed with a small portion of water. Both filtrate and wash are discarded. The antifungal is extracted from the mycelial cake with methanol using about 1 liter of methanol for every 2.5 to 3.0 liters of liquid mash. Ordinarily, a second extraction of the cake with a smaller portion of methanol ensures complete extraction. The extracts are combined and concentrated to an aqueous phase under reduced pressure. The aqueous phase is allowed to stand overnight at 4° C. A crude solid product containing components which are referred to as BH890$\alpha$ and BH890$\beta$ is formed on standing. The solid is collected and washed with acetone. The washed solid is first air dried and then dried over phosphorous pentoxide or other drying agent under reduced pressure.

The $\alpha$ component is prepared from a portion of the crude material thus prepared by repeated recrystallizations. Essentially, the $\beta$ component is removed as an impurity leaving the purified $\alpha$ component in isolated form. The recrystallizations are carried out by dissolving a portion of crude BH890 in dimethylformamide and filtering the solution. Other solvents, as for example, dimethylacetamide and dimethylsulfoxide, also may be used. Ethyl acetate or ethyl acetate and water is used to precipitate the antifungal. Ordinarily, placing the mixture in a "coldroom" (temperature around 0°–5° C.) tends to ensure complete precipitation. The crystalline solid is collected by filtration and washed with water and with acetone and air dried. The recrystallization procedure ordinarily is twice repeated in order to result in a purified BH890$\alpha$ free of the $\beta$ component.

The $\beta$ component is prepared from a portion of crude BH890 by separating the material into the $\alpha$ and $\beta$ components by solvent countercurrent distribution. A useful solvent system comprises ethyl acetate, sec-butanol, methanol and buffer in the ratio of 900 to 303 to 160 to 600 by volume respectively. The buffer is prepared by combining 6.3 ml. of triethylamine with 2 liters of water, adjusting to pH 7.5 with glacial acetic acid and diluting to 2,400 ml. with water. With a 200-tube counter-current distribution apparatus about 300 transfers is sufficient for good separation of the components. The progress of the separation may be monitored by optical density readings at 303 $\mu$ and plotting the readings against tube numbers. Appropriate fractions are combined, the liquid concentrated and lyophilized to recover both the $\alpha$ and the $\beta$ components.

PHYSICAL CHARACTERISTICS

The two components BH890$\alpha$ and Bh890$\beta$ may be distinguished by selected physical characteristics. The analytical samples of both components are essentially ash free. BH890$\alpha$ was dried under reduced pressure in an Abderhalden drying apparatus over boiling acetone for 16 hours and BH890$\beta$ was dried under reduced pressure over $P_2O_5$ over boiling acetone overnight.

Components BH890$\alpha$ and BH890$\beta$ contain the elements carbon, hydrogen, nitrogen and oxygen in substantially the following percentages by weights:

| | BH890$\alpha$ | BH890$\beta$ |
|---|---|---|
| Carbon | 58.52 | 57.78 |
| Hydrogen | 8.73 | 7.74 |
| Nitrogen | 1.78 | 1.59 |
| Oxygen (diff) | 30.97 | 32.89 |

The $\alpha$ component has no distinctive melting point. An infrared absorption spectrum of BH890$\alpha$ in a KBr pellet is prepared in the standard manner. It exhibits characteristic absorption in the infrared region of the spectrum at the following wavelengths expressed in microns: 3.00, 3.42, 5.85, 6.13, 6.40, 6.48, 6.68, 6.87 7.17, 7.57, 8.45, 8.87, 9.35, 9.65, 9.95, 10.02, 11.10, 11.35. 11.82, 13.35, and 14.37.

The infrared curve is shown in FIG. 1 of the accompanying drawings.

The $\alpha$ component in methanol shows ultraviolet absorption maxima at:

$$230\,\mu\,(E_{1\,cm}^{1\%}=315)$$

$$279\,\mu\,(E_{1\,cm}^{1\%}=298)$$

$$290\,\mu\,(E_{1\,cm}^{1\%}=588)$$

$$302\,\mu\,(E_{1\,cm}^{1\%}=905)$$

$$318\,\mu\,(E_{1\,cm}^{1\%}=815)$$

BH890$\alpha$ gives a neutralization equivalent of 936 when titrated in glacial acetic acid with perchloric acid and a neutralization equivalent of 962 when titrated in pyridine using tetrabutyl ammonium hydroxide.

The specific rotation of BH890$\alpha$ is determined in a variety of solvents and the values obtained are given in Table V immediately below.

TABLE V

Specific Rotation of BH890$\alpha$ in Various Solvents

| Solvent | Concentration | $[\alpha]^{25}_D$ |
|---|---|---|
| Dimethylformamide | 0.988% | + 19.2° |
| Dimethylsulfoxide | 1.031% | + 5.8° |
| Glacial acetic acid | 0.863% | + 10.4° |
| Pyridine | 0.930% | + 18.2° |

Figure 2:
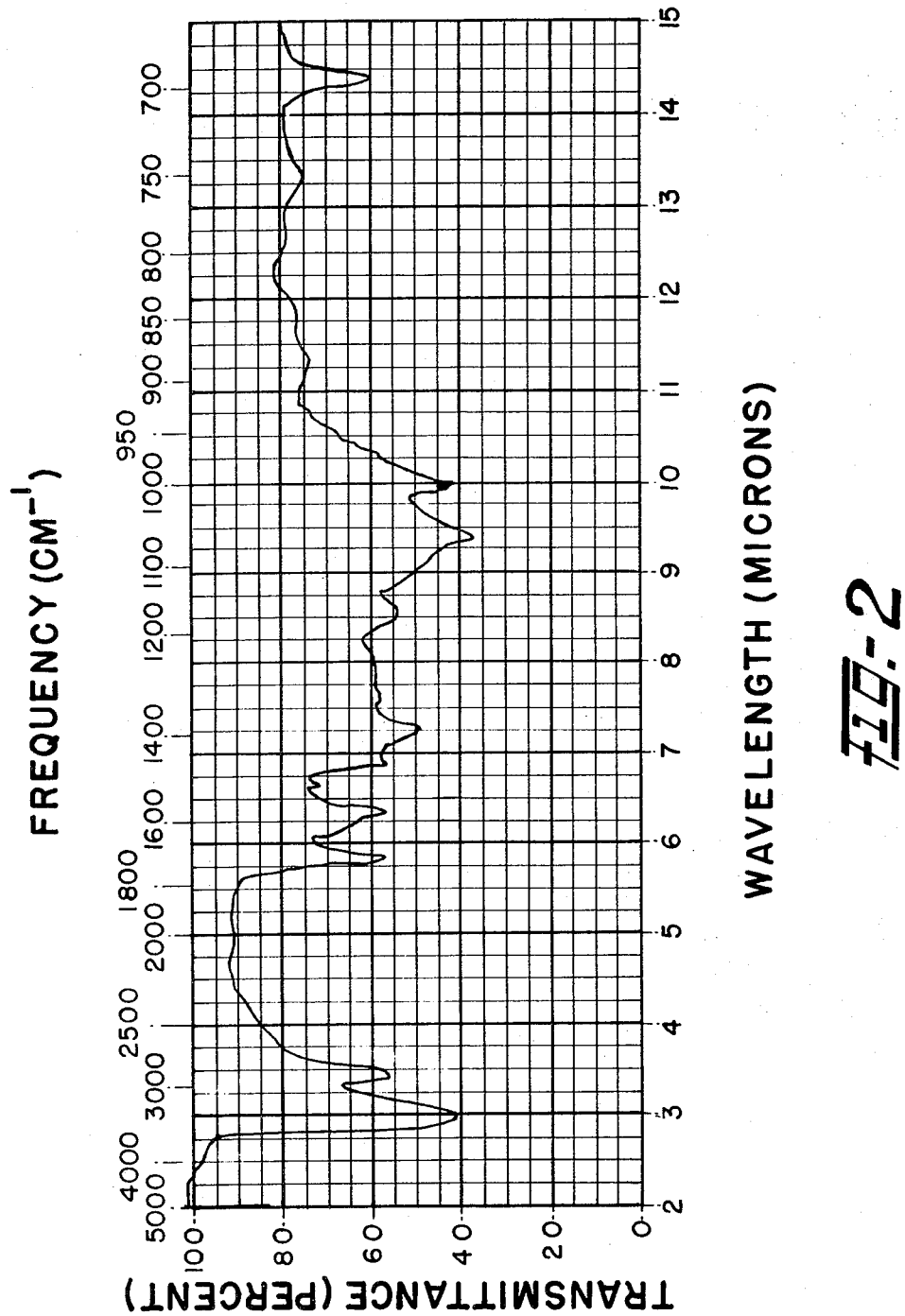

The $\beta$ component has no definitive melting point. An infrared absorption spectrum of BH890$\beta$ in a KBr pellet is prepared in the standard manner. It exhibits characteristic absorption in the infrared region of the spectrum at the following wavelengths expressed in microns: 3.00, 3.45, 5.85, 6.36, 6.70, 6.90, 7.25, 8.50, 9.40, 10.00, 11.85, 13.33, and 14.40. The infrared curve is shown in FIG. 2 of the accompanying drawings.

The β component in methanol shows ultraviolet absorption maxima at:

$$\mu (E_1 \%_{cm} = 370)$$
$$278\text{–}282 (E_1 \%_{cm} = 320)$$
$$289 \mu (E_1 \%_{cm} = 616)$$
$$302 \mu (E_1 \%_{cm} = 934)$$
$$318 \mu (E_1 \%_{cm} = 840)$$

The specific rotation of BH890β is determined in a variety of solvents and the values obtained are given in Table VI, following.

TABLE VI

Specific Rotation of BH890β in Various Solvents

| Solvent | Concentration | $[\alpha]_{25}^D$ |
|---|---|---|
| Dimethylformamide | 0.747% | − 4.03° |
| Dimethylsulfoxide | 0.951% | − 18.7° |
| Glacial acetic acid | 0.993% | − 8.07° |
| Pyridine | 1.038% | 9.7° |

Antifungal BH890 is clearly distinguished from other antifungals by the characterization data given above and by its antifungal activity. The in vitro activity of this new antifungal is presented in the Table below which shows the minimal inhibitory concentration required to inhibit the growth of representative microorganisms in a nutrient medium.

TABLE VII

In Vitro Antifungal Activity of BH890*

| Organism | Minimal Inhibitory Concentration mcg./ml. |
|---|---|
| *Candida albicans* 300 (E83) | 2 |
| *Cryptococcus neoformans* SP (E138) | 2 |
| *Epidermophyton floccosum* ATCC 10227 (E139) | 1 |
| *Microsporum audouini* ATCC 14057 (E140) | 2 |
| *Microsporum canis* ATCC 10214 (E55) | 5 |
| *Microsporum gypseum* ATCC 14683 (E130) | 2.5 |
| *Phialophthora jeanselmei* NIH 8724 (E16) | 5 |
| *Trichophyton rubrum* (E97) | 2.5 |
| *Trichophyton tonsurans* NIH 662 (E10) | 2 |
| *Trichophyton mentagrophytes* (E11) | 2.5 |

*Standard agar dilution procedure

Antifungal BH890 is active in vivo against *Candida albicans* and *Cryptococcus neoformans*. The new antifungal is thereby potentially useful as a therapeutic agent in treating fungal infections in mammals caused by said microorganisms. The new antifungal can be expected to be usefully employed for treating or combating such infections by topical application or parenteral administration or when taken orally.

The usefulness of the new antifungal is demonstrated by its ability to control systemic lethal infections by or with these organisms in mice.

The test with *C. albicans* was run with Carworth Farms CF 1 female mice, weight about 20 grams, infected intravenously with a lethal dose of a 1:20 dilution of a 24 hour trypticase soy broth culture of the organism. The infected mice were treated with Bh890 in varying dosages by subcutaneous injections within 1 hour after infection or subcutaneous injections within 1 hour after infection followed by a second dose 4 hours later. Record was made of the size of each group and the number of mice remaining alive 6 days after infection.

Table VIII below illustrates antifungal activity of BH890 against *C. albicans*.

TABLE VIII

| Total dosage mg./mouse | Alive/Total mice, 6 days after infection | |
|---|---|---|
| | Single Dose | Two Doses |
| 4 | 8/15 | 8/10 |
| 1 | 1/15 | 6/10 |
| 0.25 | 0/15 | 0/10 |

Infected, non-treated control mice: 0.60
Non-infected, non-treated control mice: 15/15

The test with *C. neoformans* was run with Carworth Farms CF 1 female mice, weight about 20 grams, infected intravenously with a lethal dose of a 24 hour trypticase soy broth culture of the organism. The infected mice were treated with BH890 in varying dosages by subcutaneous injections within 1 hour after infection or subcutaneous injections within 1 hour after infection followed by a second dose 24 hours later. Alive to total mice were observed and noted 7 days after infection.

Table IX below illustrates antifungal activity of BH890 against *C. neoformans*.

TABLE IX

| Total dosage mg./mouse | Alive/Total mice, 7 days after infection | |
|---|---|---|
| | Single Dose | Two Doses |
| 4 | 9/15 | 7/10 |
| 1 | 8/15 | 5/10 |
| 0.25 | 3/15 | 0/10 |

Infected, non-treated control mice: 1/60.
Non-infected, non-treated control mice: 15/15.

The invention will be described in greater detail in conjunction with the following specific examples.

EXAMPLE 1

Inoculum Preparation

A typical medium used to grow the primary inoculum was prepared according to the following formula:

| | |
|---|---|
| Cerelose | 20 grams |
| Soy flour | 10 grams |
| Corn steep liquor | 5 grams |
| Calcium carbonate | 3 grams |
| Water to | 1,000 milliliters. |

Washed or scraped spores from an agar slant of *S. misionensis* are used to inoculate 2 500 milliliter flasks containing 100 milliliters each of the above sterile medium. The flasks are then placed on a rotary shaker and agitated vigorously for 48 hours at 28° C. The resulting flask inoculum is transferred to a 5 gallon glass fermentor containing 12 liters of the sterile medium. The glass fermentor is aerated with sterile air while growth is carried out for about 48 hours, after which time the contents are used to seed a 300-liter tank fermentor.

EXAMPLE 2

Fermentation

A fermentation medium is prepared according to the following formula:

| | |
|---|---|
| Starch | 52.5 grams |
| Corn flour | 14.5 grams |
| Corn steep liquor | 15.0 grams |
| Calcium carbonate | 9.5 grams |
| Ammonium sulfate | 6.75 grams |
| Casein | 3.0 grams |
| Cottonseed flour | 2.5 grams |
| Ammonium chloride | 2.0 grams |
| Manganese sulfate | 0.10 grams |
| Water to | 1,000 milliliters. |

Lard oil is used in the medium in the amount of 0.8 percent v/v. The fermentation medium is sterilized at 120° C. with steam at 20 pounds pressure for 45–60 minutes. The pH of the medium after sterilization is about 6.6. Three hundred liters of sterile medium in a 400-liter tank fermentor is inoculated with 12 liters of inoculum, prepared as described in Example 1. The fermentation is carried out at 28° C. using Hodag LG-8 oil as a defoaming agent. Aeration is supplied at the rate of 0.5 liter of sterile air per liter of mash per minute. The mash is agitated by an impeller driven at about 300 revolutions per minute. At the end of approximately 66 hours of fermentation time the mash is harvested.

EXAMPLE 3

Isolation

300 Liters of fermented mash are filtered with about 2 percent (w/v) of diatomaceous earth filter aid and the filter pad is washed with about 30 liters of water. The pooled filtrate and wash are discarded. The washed cake is stirred in about 100 liters of methanol for about one-half hour. The suspension is filtered and the cake is washed with an additional 20 liters of methanol. The combined methanol wash and filtrate are concentrated to an aqueous phase (volume about 6 liter) and this concentrate is allowed to stand overnight at 4° C. A birefringent solid which forms on standing is collected by centrifugation and washed with acetone. The residual acetone is removed by evaporation into the air and the solid is dried over $P_2O_5$ under reduced pressure. The dried crystalline solid of crude BH890 weighs 118 grams.

EXAMPLE 4

Preparation of BH890α

A portion (40 grams) of the crude BH890, as obtained from the previous example, is dissolved in 150 ml. of dimethylformamide and the mixture is filtered. Ethyl acetate is added to the filtrate until the "cloud point" is reached. About 150 ml. of water is added after which an additional 150 ml. of ethyl acetate is added with stirring. The resultant mixture is allowed to stand overnight at 4° C. The light yellow colored solid which forms and is suspended in the two phase system is collected by filtration and washed first with water and then with acetone. The air-dried solid weighs 29 grams. The crude material is recrystallized twice again by first dissolving in dimethylformamide and repeating the above procedure from that point on. About 4.4 grams of purified BH890α having the physical and chemical characteristics hereinbefore described is obtained after three recrystallizations.

EXAMPLE 5

Preparation of BH890β

Crude BH890 as obtained from Example 3, is used as starting material and separated into α and β components by solvent countercurrent distribution. The solvent system is composed of ethyl acetate, sec-butanol, methanol and buffer (900:303:160:600 by volume) wherein the buffer is prepared by stirring together triethylamine (6.3 ml.) and water (2 liters) and adjusting the pH of the solution to 7.5 with glacial acetic acid and diluting to 2,400 ml. with water. The countercurrent distribution is carried out in a 200 tube apparatus using 10 ml. of lower phase and 10 ml. of upper phase per tube and 310 transfers. The sample charge is placed in the first 15 tubes by preparing a saturated solution of BH890 in 150 ml. of lower phase and 150 ml. of upper phase, giving a net charge of 350 mg. At the completion of 310 transfers a one-half ml. portion of lower phase is withdrawn from selected tubes. Each sample is diluted with 10 ml. of methanol and its optical density at 303 $\mu$ is determined. A curve having first a minor and then a major peak is obtained by plotting optical density against tube number. Tube numbers 85 to 120 comprise BH890β and tube numbers 113 to 150 comprise BH890α. Appropriate tubes are combined and the liquids concentrated separately to an aqueous phase, filtered and lyophilized. Each of the solids obtained on lyophilization is triturated with acetone, filtered, washed with acetone again and then air dried. The analytically pure sample, BH890β weighing 38 mg., and 140 mg. of BH890α are obtained.

What is claimed is:
1. A substance antibiotic BH890α, a compound which
   a. is effective in inhibiting the growth of fungi, and in its essentially pure crystalline form;
   b. has the following elemental analysis:
      C, 58.52; H, 8.73; N, 1.78; O, 30.97;

c. has ultraviolet maxima at: 230 $\mu$ ($E^{1\%}_{1\,cm}=315$), 279 $\mu$ ($E^{1\%}_{1\,cm}=298$), 290 $\mu$ ($E^{1\%}_{1\,cm}=588$), 302 $\mu$ ($E^{1\%}_{1\,cm}=905$), 318 $\mu$ ($E^{1\%}_{1\,cm}=815$); and d. has a characteristic infrared absorption spectrum as shown in FIG. 1.

2. A substance antibiotic BH890$\beta$, a compound which a. is effective in inhibiting the growth of fungi, and in its essentially pure crystalline form;

b. has the following elemental analysis: C, 57.78; H, 7.74; N, 1.59; O, 32.89;

c. has ultraviolet maxima at: 230 $\mu$ ($E^{1\%}_{1\,cm}=370$), 278$\mu$ ($E^{1\%}_{1\,cm}=320$), 289 $\mu$ ($E^{1\%}_{1\,cm}=616$), 302 $\mu$ ($E^{1\%}_{1\,cm}=934$), 318 $\mu$ ($E^{1\%}_{1\,cm}=840$); and d. has a characteristic infrared absorption spectrum as shown in FIG. 2.

3. A compound selected from the group consisting of antibiotic BH890$\beta$ as characterized in claim 1 and antibiotic BH890$\beta$ as characterized in claim 4.

* * * * *

UNITED STATES PATENT OFFICE
CERTIFICATE OF CORRECTION

Patent No. 3,700,769      Dated October 24, 1972

Inventor(s) John Henry Edward James Martin and John Norman Porter

It is certified that error appears in the above-identified patent and that said Letters Patent are hereby corrected as shown below:

Column 1, line 31, after "(1966)]" insert -- . Media used in the study were selected from --.

Column 3, Table III, under the heading "Physiological Reaction", the first entry should read -- Slight reduction of nitrate to nitrite. --; the second entry should read -- Nitrate reduced to nitrite. --.

Column 7, line 10, "$\mu(E_{1cm}^{1\%} = 370)$" should read -- $230\mu(E_{1cm}^{1\%} = 370)$ --; line 12, "$27882(E_{1cm}^{1\%} = 320)$" should read -- $278\mu(E_{1cm}^{1\%} = 320)$ --; Table VI, under the heading "$[\alpha]_{25}^{D}$", the last entry should read -- $-9.7°$ --.

Column 12, Claim 3 should read as follows: -- A compound selected from the group consisting of antibiotic BH890α as characterized in Claim 1 and antibiotic BH890β as characterized in Claim 2. --.

Signed and sealed this 29th day of May 1973.

(SEAL)
Attest:

EDWARD M. FLETCHER, JR.
Attesting Officer

ROBERT GOTTSCHALK
Commissioner of Patents